No. 783,650. PATENTED FEB. 28, 1905.
C. H. STRATTON.
CONVERTIBLE VEHICLE.
APPLICATION FILED MAY 31, 1904.

2 SHEETS—SHEET 1.

Witnesses:—
R. W. Rimmer.
E. A. Volk.

Inventor
by C. H. Stratton
Wilhelm Parker & Hard,
Attorneys.

No. 783,650. PATENTED FEB. 28, 1905.
C. H. STRATTON.
CONVERTIBLE VEHICLE.
APPLICATION FILED MAY 31, 1904.
2 SHEETS—SHEET 2.
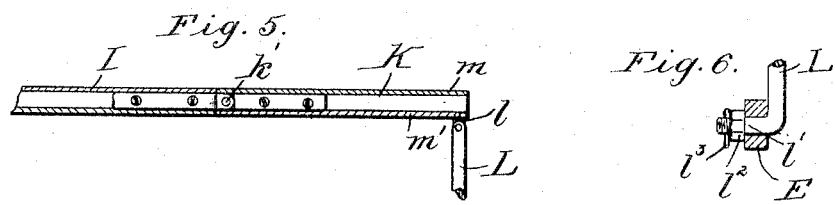
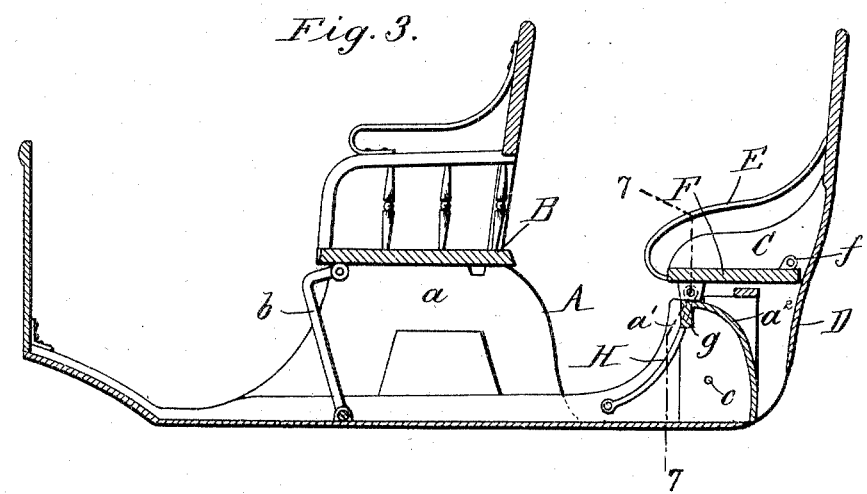
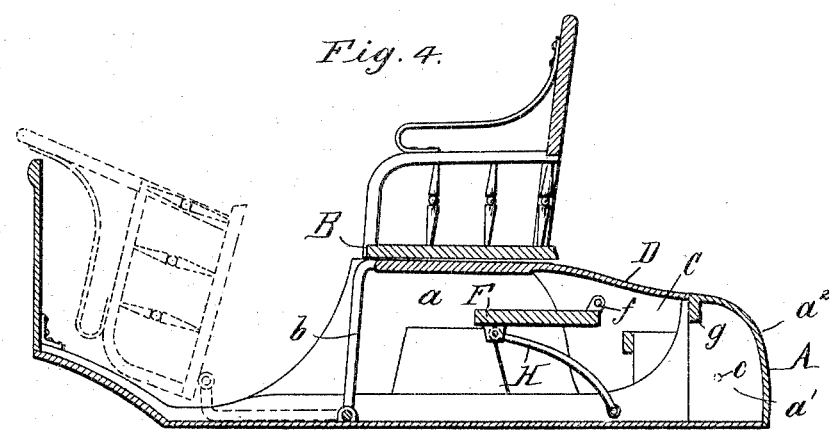
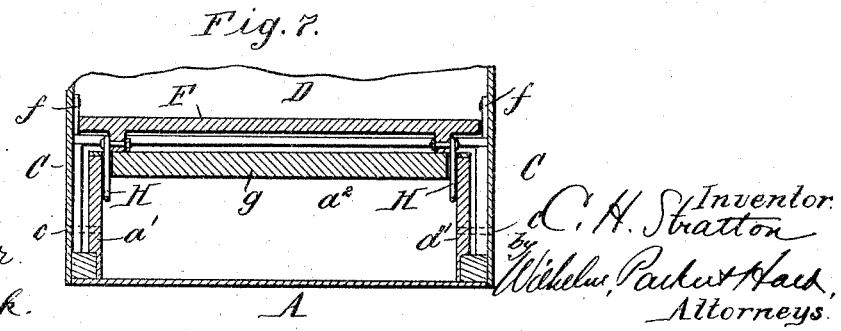

No. 783,650.

Patented February 28, 1905.

UNITED STATES PATENT OFFICE.

CHARLES H. STRATTON, OF MUNCIE, INDIANA.

CONVERTIBLE VEHICLE.

SPECIFICATION forming part of Letters Patent No. 783,650, dated February 28, 1905.

Application filed May 31, 1904. Serial No. 210,390.

*To all whom it may concern:*

Be it known that I, CHARLES H. STRATTON, a citizen of the United States, residing at Muncie, in the county of Delaware and State of Indiana, have invented new and useful Improvements in Convertible Vehicles, of which the following is a specification.

This invention relates to shifting-seat or convertible one and two seated vehicles.

One object of the invention is to provide a desirable vehicle having a top which can be readily converted into an attractive and stylish one or two seated vehicle, as desired, without detaching or disconnecting the top or its supports from the shifting part of the vehicle.

Another object of the invention is to so construct the shifting rear seat that the bottom or cushion frame can be made in one piece, which can have springs in it, if it is desired, and will drop down far enough in the vehicle-body when the seat is not in use to give room for cushion and back.

Figure 1:
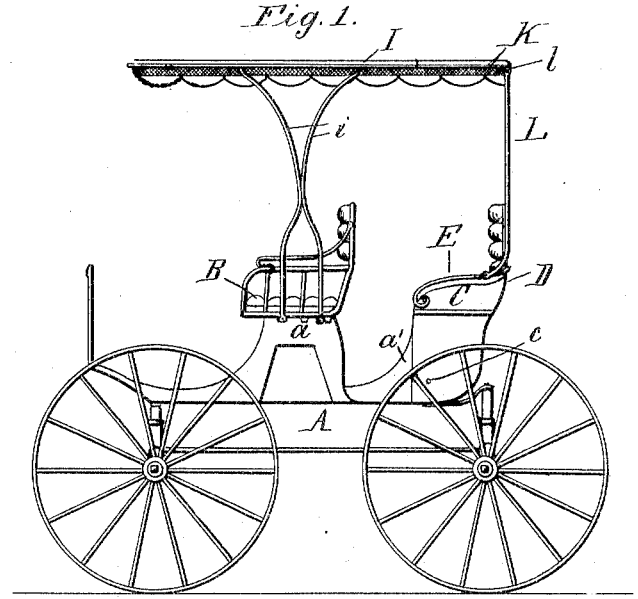
Figure 2:
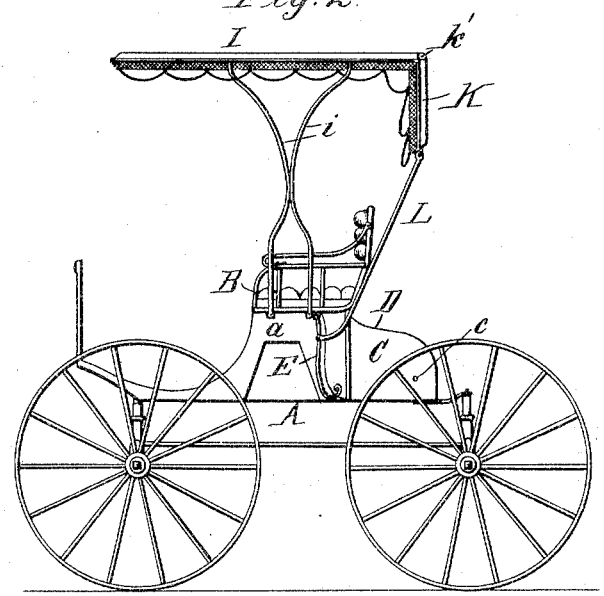

In the accompanying drawings, Figure 1 is a side elevation of the vehicle embodying the invention, showing the same in the form of a two-seated canopy-top surrey. Fig. 2 is a side elevation of the same converted into a single-seat canopy-top stanhope or phaeton. Fig. 3 is a sectional elevation of the body of the vehicle, on an enlarged scale, showing both seats in position for use. Fig. 4 is a similar view showing the rear seat out of use and folded down beneath the front seat. Fig. 5 is a fragmentary sectional elevation, on an enlarged scale, of the top. Fig. 6 is a detail section of the hinge of one of the rear supports of the top. Fig. 7 is a transverse section, on an enlarged scale, of the body and rear seat in line 7 7, Fig. 3.

Like letters of reference refer to like parts in the several figures.

A represents the body of the vehicle, which is provided at opposite sides, intermediate of its ends, with side panels $a$, which extend upwardly from the bottom of the body and may flare outwardly, and with side pieces $a'$, which extend up from the bottom, in rear of the side panels $a$, and are connected by a back $a^2$, which curves or inclines forwardly and upwardly and constitutes a portion of the deck of the body when the vehicle is used as a stanhope or single-seat conveyance.

B represents the front seat which rests upon the top of the forward side panels and frame $a$ and is connected to swinging arms or links $b$, pivoted to the bottom of the body, whereby the seat can be swung forwardly on the arms and turned down into the position shown by dotted lines in Fig. 4 to enable the rear seat to be folded down beneath the front seat and to afford space between the front seat and the side panels for a person to enter and leave the vehicle.

The rear seat comprises sides C, arranged outside of and pivoted to the side pieces $a'$ of the body at or near $c$, and a back D, connecting said sides. The back of the rear seat is narrow enough to fit in between the side panels $a$ of the body, and its sides are located in the same vertical planes as and their upper edges conform to the shape of the rear edges of said side panels, so that when the rear seat is turned down its back forms a deck and its sides constitute rear side panels for the single-seat vehicle, as shown in Fig. 2. The back is supported in the turned-down or inoperative position by its arm-rails E, which have inbent rear portions which overhang or rest on the side panels $a$ of the body.

The parts above, briefly described, are similar to the corresponding parts in my United States Letters Patent No. 694,037, dated February 25, 1902.

The bottom cushion-frame F of the rear seat is in one piece, or unbroken, and is supported at the rear by arms $f$, secured to its sides and extending upwardly and rearwardly therefrom and pivoted to the sides of the rear seat above the plane of the bottom frame when in use in any suitable manner. The front of the cushion-frame when in use is supported by arms H, which are pivoted at their upper ends to blocks depending from the front portion of the bottom frame on the rear cushion-frame and at their lower ends to the lower portions of the sides of the body. The arms and hangers $f$ are so arranged and proportioned that when the rear seat is swung forwardly and downwardly to the position shown in Fig. 4 the cushion-frame will drop to a substantially horizontal position far enough to clear the back of the rear seat. The described manner of mounting the cushion-frame not only enables the same to be made in a single piece, but also affords an almost unobstructed space under the rear seat when not in use, in which articles can be placed and carried. The described construction therefore is an improvement over that disclosed in my said patent, in which the rear seat bottom frame is made in two hinged sections.

The vehicle is provided with a canopy-top, which consists of a fixed front section I, supported by suitable standards $i$, of any preferred form, secured to and rising from the side frame or panels $a$ of the body of the vehicle, and a rear section K, which is connected at its front edge by hinges $k'$, of any suitable form, to the rear edge of the fixed front section and is supported by the rear posts L, pivoted at their upper ends to the back portion of the rear section of the top and at their lower ends to the arm-rails or other suitable parts of the rear seat. Preferably the upper ends of the rear posts are pivoted to irons $l$, secured to the hinged top-section, and their lower ends have inwardly-extending journals $l'$, Fig. 6, which pass through bearing-holes in the arm-rails of the rear seat, in which they are held by nuts $l^2$, screwed on the threaded ends of the journals, on which they are secured against detachment by pins $l^3$. The top can be provided with an unbroken or continuous cover $m$ and lining $m'$, Fig. 5, and the hinges $k'$ are located inside of the edge molding or fringe, so that the top presents an unbroken and neat appearance when the vehicle is used as a two-seated surrey. When it is desired to use only the front seat and the rear seat is turned down, it is not necessary to detach the rear posts from either the rear seat or the hinged section of the top. They swing down with the rear seat to the position shown in Fig. 2 and turn the hinged rear section of the top down to the vertical position, (shown in Fig. 2,) in which it constitutes a sunshade for the single-seat vehicle or stanhope. No trouble or inconvenience is experienced, therefore, in converting the vehicle from the two to the one seat conveyance, and vice versa. The fixed standards for the stationary front section of the top are not connected to the front seat and permit the same to be shifted on its supports to the different positions shown in the drawings and to be turned forward on its links.

Curtains such as employed with the ordinary canopy-top surrey can be employed with the vehicle described, and when it is used as a stanhope the rear quarter-curtains are removed and the lower rear portions of the side curtains are folded around the rear top-posts L and secured to the back curtain, thus enabling the inclosing of the vehicle in either of its forms.

I claim as my invention—

1. In a convertible vehicle, the combination of a body, a rear seat or cushion-frame which is movably connected to the body to be shifted into or out of operative position, a top comprising a front section, and a rear hinged section, and supporting-posts pivoted to said hinged top section and to said movable rear seat to move with the latter and fold said hinged top section down to a substantially vertical position without detaching said posts from said hinged top section or rear seat, substantially as set forth.

2. In a convertible vehicle, the combination of a body, a rear seat which is pivoted to the body and is adapted to be turned forwardly and downwardly, a top for the vehicle comprising a front section, and a rear hinged section, and supporting-posts for the rear section of the top pivoted to said hinged top section and to said rear seat to swing forwardly and downwardly with said rear seat and fold said hinged top section down to a substantially vertical position, substantially as set forth.

3. In a convertible vehicle, the combination of a body, a rear seat which is pivoted to the body and is adapted to be swung forwardly and downwardly, a top for the vehicle comprising a front section and a rear hinged section, and supporting-posts for the rear section of the top pivoted to said rear top section and arranged outside of and pivoted to said rear seat whereby said hinged section of the top is folded down to a substantially vertical position when said rear seat is swung forwardly and downwardly, substantially as set forth.

4. In a convertible vehicle, the combination of a body, a front seat, a rear seat which is pivoted to the body and is adapted to be turned down beneath the front seat, a top for the vehicle comprising a fixed front section, and a rear hinged section, and supporting-posts for the rear section of the top pivoted to said hinged top section, and arranged outside of and pivoted to said rear seat to swing forwardly and downwardly with said rear seat and fold said hinged top section down to a substantially vertical position, substantially as set forth.

Witness my hand this 17th day of May, 1904.

CHARLES H. STRATTON.

Witnesses:
LEWIS A. WAMPLER,
JOHN SKELLY SHUPE.